US012596551B2

(12) United States Patent
Cui

(10) Patent No.: US 12,596,551 B2
(45) Date of Patent: Apr. 7, 2026

(54) METHOD AND SYSTEM FOR ASSIGNING INSTRUCTIONS TO DECODERS IN DECODER CLUSTERS

(71) Applicant: Hygon Information Technology Co., Ltd., Tianjin (CN)

(72) Inventor: Zehan Cui, Tianjin (CN)

(73) Assignee: Hygon Information Technology Co., Ltd., Tianjin (CN)

( * ) Notice: Subject to any disclaimer, the term of this patent is extended or adjusted under 35 U.S.C. 154(b) by 0 days.

(21) Appl. No.: 18/717,527

(22) PCT Filed: Feb. 27, 2023

(86) PCT No.: PCT/CN2023/078433
§ 371 (c)(1),
(2) Date: Jun. 7, 2024

(87) PCT Pub. No.: WO2024/093062
PCT Pub. Date: May 10, 2024

(65) Prior Publication Data
US 2025/0045055 A1      Feb. 6, 2025

(30) Foreign Application Priority Data

Oct. 31, 2022    (CN) ......................... 202211348804.1

(51) Int. Cl.
*G06F 9/38*          (2018.01)
*G06F 9/30*          (2018.01)
(52) U.S. Cl.
CPC ........ *G06F 9/3822* (2013.01); *G06F 9/30145*
(2013.01); *G06F 9/3814* (2013.01)
(58) Field of Classification Search
CPC .... G06F 9/30; G06F 9/30145; G06F 9/30149;
G06F 9/30152; G06F 9/3822;
(Continued)

(56) References Cited

U.S. PATENT DOCUMENTS

2007/0067608 A1*   3/2007   Lofgren ................ G06F 9/3867
712/219
2009/0172359 A1*   7/2009   Shen ..................... G06F 9/3842
712/23
(Continued)

FOREIGN PATENT DOCUMENTS

CN          107358125          11/2017
CN          115525343          12/2022

OTHER PUBLICATIONS

Extended European Search Report for Application No. 23884010.2, dated Apr. 29, 2025, 9 pages.

*Primary Examiner* — Jyoti Mehta
*Assistant Examiner* — Emilio Alcantara-Ramos
(74) *Attorney, Agent, or Firm* — Fox Rothschild LLP

(57) ABSTRACT

A method for parallel decoding which is applied to a processor including a first decoder cluster and a second decoder cluster, the second decoder cluster being provided with at least one shared decoder shared by the first decoder cluster. In the method, if a quantity of a plurality of instructions is greater than a quantity of decoders in the first decoder cluster, the processor assigns, from the plurality of instructions, first instructions with a quantity corresponding to the quantity decoders of the first decoder cluster to a decoder in the first decoder cluster for decoding, and the processor assigns, from the plurality of instructions, at least one second instruction other than the first instructions to the at least one shared decoder for decoding. The processor then writes micro-ops obtained by decoding the first instructions and micro-ops obtained by decoding the at least one second instruction into a first micro-op queue.

18 Claims, 7 Drawing Sheets

(58) Field of Classification Search
CPC ...... G06F 9/382; G06F 9/3889; G06F 9/3888;
G06F 9/50; G06F 9/5011; G06F 9/5061;
G06F 9/5077; G06F 9/3814; G06F
9/3818
See application file for complete search history.

(56) References Cited

U.S. PATENT DOCUMENTS

| | | | |
|---|---|---|---|
| 2018/0088956 A1 | 3/2018 | Combs | |
| 2019/0196947 A1* | 6/2019 | Hu | G06F 11/3692 |
| 2021/0216326 A1* | 7/2021 | Benisty | G06F 9/546 |
| 2022/0100500 A1 | 3/2022 | Madaelil et al. | |
| 2022/0100519 A1* | 3/2022 | Cohen | G06F 9/3867 |
| 2023/0315473 A1* | 10/2023 | Azeem | G06F 9/382 |
| | | | 712/213 |

* cited by examiner

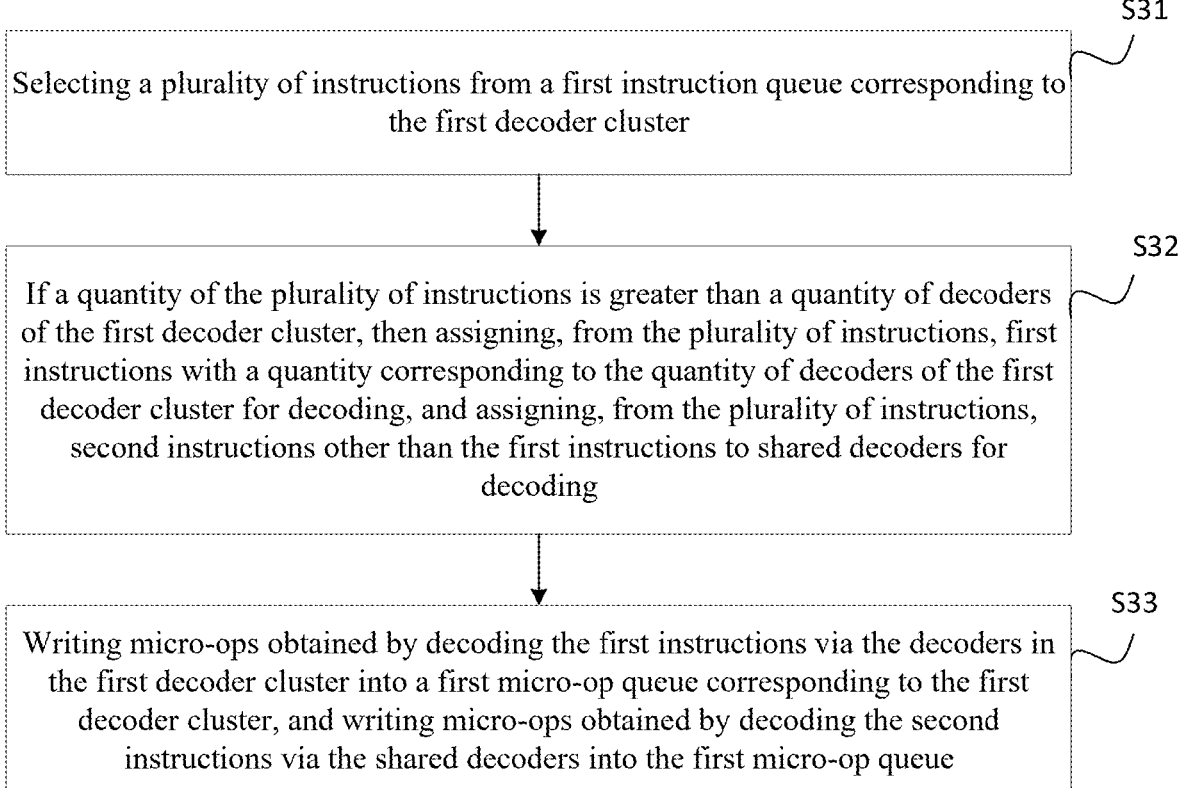

S31

Selecting a plurality of instructions from a first instruction queue corresponding to the first decoder cluster

S32

If a quantity of the plurality of instructions is greater than a quantity of decoders of the first decoder cluster, then assigning, from the plurality of instructions, first instructions with a quantity corresponding to the quantity of decoders of the first decoder cluster for decoding, and assigning, from the plurality of instructions, second instructions other than the first instructions to shared decoders for decoding

S33

Writing micro-ops obtained by decoding the first instructions via the decoders in the first decoder cluster into a first micro-op queue corresponding to the first decoder cluster, and writing micro-ops obtained by decoding the second instructions via the shared decoders into the first micro-op queue

Passing a request carrying the second instructions to a selector in the second decoder cluster connected to a shared decoder

S42

When the shared decoder is idle, assigning a second instruction to the shared decoder for decoding via the selector

| First Decoder Cluster 1031 | Actually-used Bandwidth | Second Decoder Cluster 1032 | Actually-used Bandwidth |
|---|---|---|---|
| The first instruction queue is null or the first micro-op queue is full | 0 | The second instruction queue is null or the second micro-op queue is full | 0 |
| The first instruction queue is null or the first micro-op queue is full | 0 | The second instruction queue is not null and the second micro-op queue is not full | Up to 4 |
| The first instruction queue is not null and the first micro-op queue is not full | Up to 4 | The second instruction queue is null or the second micro-op queue is full | 0 |
| The first instruction queue is not null and the first micro-op queue is not full, and the quantity of selectable instructions in the first instruction queue is less than or equal to 2 | Up to 2 | The second instruction queue is not null and the second micro-op queue is not full | Up to 4 |
| The first instruction queue is not null and the first micro-op queue is not full | Up to 4 | The second instruction queue is not null and the second micro-op queue is not full, and the quantity of selectable instructions in the second instruction queue is less than or equal to 2 | Up to 2 |
| The first instruction queue is not null and the first micro-op queue is not full and the quantity of selectable instructions in the first instruction queue is greater than or equal to 3 | 3 | The second instruction queue is not null and the second micro-op queue is not full and the quantity of selectable instructions in the second instruction queue is greater than or equal to 3 | 3 |

Fig. 6

METHOD AND SYSTEM FOR ASSIGNING INSTRUCTIONS TO DECODERS IN DECODER CLUSTERS

This application is a national phase of International Patent Application No. PCT/CN2023/078433, filed on Feb. 27, 2023, which claims priority to Chinese Patent Publication No. 202211348804.1, filed on Oct. 31, 2022. The entire disclosures of the aforementioned applications are incorporated by reference as part of the disclosure of this application.

TECHNICAL FIELD

Embodiments of the present disclosure relates to a method for parallel decoding, processor, chip and electronic device.

BACKGROUND

In modern processors, it is required for instructions to go through the processing procedures of fetching, decoding, and executing; among them, decoding is the process in which the decoder parses and compiles the fetched instructions to obtain micro-ops.

In order to increase the decoding throughput, a plurality of decoder clusters may be provided in the processor for parallel decoding of instructions, and a plurality of decoders may be provided within one decoder cluster for parallel decoding. However, if the quantity of decoders provided in a decoder cluster is too much, it will lead to a waste of hardware resources of the processor; therefore, how to optimize the decoding scheme so as to guarantee the decoding throughput and implement the saving of hardware resources of the processor under a reasonable setting of the number of decoders has become a technical problem to be solved by the skilled persons in the art.

SUMMARY

In view of the above, embodiments of the present disclosure provide a method for parallel decoding, processor, chip, and electronic device, being capable of reducing the number of decoders used in a decoder cluster while guaranteeing the decoding throughput, thereby saving the hardware resources of the processor.

In order to implement the above objects, embodiments of the present disclosure provide the following technical solutions:

In a first aspect, embodiments of the present disclosure provide a method for parallel decoding, which is applied to a processor, the processor including at least a first decoder cluster and a second decoder cluster, the second decoder cluster being provided with at least one shared decoder shared by the first decoder cluster; the method includes:

selecting a plurality of instructions from a first instruction queue corresponding to the first decoder cluster;

if a quantity of the plurality of instructions is greater than a quantity of decoders of the first decoder cluster, then assigning first instructions with a quantity corresponding to the quantity of decoders of the first decoder cluster in the plurality of instructions to a decoder in the first decoder cluster for decoding, and assigning second instructions other than the first instructions in the plurality of instructions to the at least one shared decoder for decoding; and writing micro-ops obtained by decoding the first instructions via decoders in the first decoder cluster into a first micro-op queue corresponding to the first decoder cluster, and writing micro-ops obtained by decoding the second instructions via the at least one shared decoder into the first micro-op queue.

In a second aspect, embodiments of the present disclosure provide a processor, including at least a first decoder cluster and a second decoder cluster; the second decoder cluster being provided with at least one shared decoder shared by the first decoder cluster;

the first decoder cluster including: a first instruction selection module and a plurality of decoders;

the first instruction selection module, is configured to select a plurality of instructions from a first instruction queue corresponding to the first decoder cluster; if a quantity of the plurality of instructions is greater than a quantity of decoders of the first decoder cluster, then assigning first instructions with a quantity corresponding to the quantity of decoders of the first decoder cluster in the plurality of instructions to a decoder in the first decoder cluster for decoding, and assigning second instructions other than the first instructions in the plurality of instructions to the at least one shared decoder for decoding; and the plurality of decoders are configured to decode the first instructions and write micro-ops obtained by decoding the first instructions into a first micro-op queue corresponding to the first decoder cluster;

wherein, the at least one shared decoder is configured to decode the second instructions and write micro-ops obtained by decoding the second instructions into the first micro-op queue.

In a third aspect, embodiments of the present disclosure provide a chip which includes the processor as described above.

In a fourth aspect, embodiments of the present disclosure provide an electronic device which includes the chip as described above.

According to embodiments of the present disclosure, in the case where a processor at least includes a first decoder cluster and a second decoder cluster, at least one shared decoder shared by the first decoder cluster is provided in the second decoder cluster. Therefore, when the first decoder cluster decodes instructions, a plurality of instructions can be selected from a first instruction queue corresponding to the first decoder cluster; if a quantity of the plurality of instructions is greater than a quantity of decoders of the first decoder cluster, then first instructions with a quantity corresponding to the quantity of decoders of the first decoder cluster in the plurality of instructions is assigned to decoders in the first decoder cluster for decoding, and second instructions other than the first instructions in the plurality of instructions is assigned to the shared decoder for decoding; therefore, when a quantity of instructions to be decoded by the first decoder cluster is greater than a quantity of decoders of the first decoder cluster, shared decoders in the second decoder cluster can be utilized to decode spare instructions, the decoding throughout can be guaranteed when the quantity of decodes of the first decoder cluster is insufficient by re-using the shared decoder in the second decoder cluster. When the shared decoders in the first decoder cluster and the second decoder cluster have completed decoding, the micro-ops obtained by the decoders in the first decoder cluster from decoding the first instructions can be written into the first micro-op queue corresponding to the first decoder cluster, and, micro-ops obtained by the shared decoder from decoding the second instructions can be written into the first micro-op queue corresponding to the first decoder cluster, thereby guaranteeing that when the first decoder cluster decodes the instructions by utilizing the external shared decoder, the instructions decoded by the shared decoder can be correctly written into the micro-op queue corresponding to the first decoder cluster, thereby guaranteeing the accuracy of the instructions decoded by the first decoder cluster.

Thus, embodiments of the present disclosure are capable of utilizing a shared decoder in an external decoder cluster to decode spare instructions when a quantity of decoders in a first decoder cluster is insufficient to decode a plurality of instructions to be selected, thereby being able to reduce the quantity of decoders used in the first decoder cluster when the quantity of decoders of the decoder cluster is provided to be less than the upper limit of the quantity of instructions to be selected, and thereby reducing the quantity of decoders used in the decoder cluster to achieve the effect of saving the processor's hardware resources while guaranteeing the decoding throughput.

BRIEF DESCRIPTION OF THE DRAWINGS

In order to more clearly illustrate the embodiments of the present disclosure, the accompanying drawings to be used in the embodiments will be briefly described below, and it will be apparent that the accompanying drawings in the following description are only embodiments of the present disclosure, and that other accompanying drawings may be obtained by a person of ordinary skill in the art in accordance with the accompanying drawings as provided, without the expenditure of creative labor.

FIG. 3B shows an optional flowchart of parallel decoding provided by at least one embodiment of the present disclosure;

FIG. 6 shows a schematic diagram of the maximum bandwidth of the decoder cluster to support instruction decoding provided by at least one embodiment of the present disclosure.

DETAILED DESCRIPTION

Embodiments of the present disclosure will be clearly and completely described below in conjunction with the accompanying drawings in the embodiments of the present disclosure, and it is clear that the described embodiments are only a portion of the embodiments of the present disclosure, and not all of the embodiments. Based on the embodiments in the present disclosure, all other embodiments obtained by a person of ordinary skill in the art without making creative labor fall within the scope of protection of the present disclosure.

Figure 1:
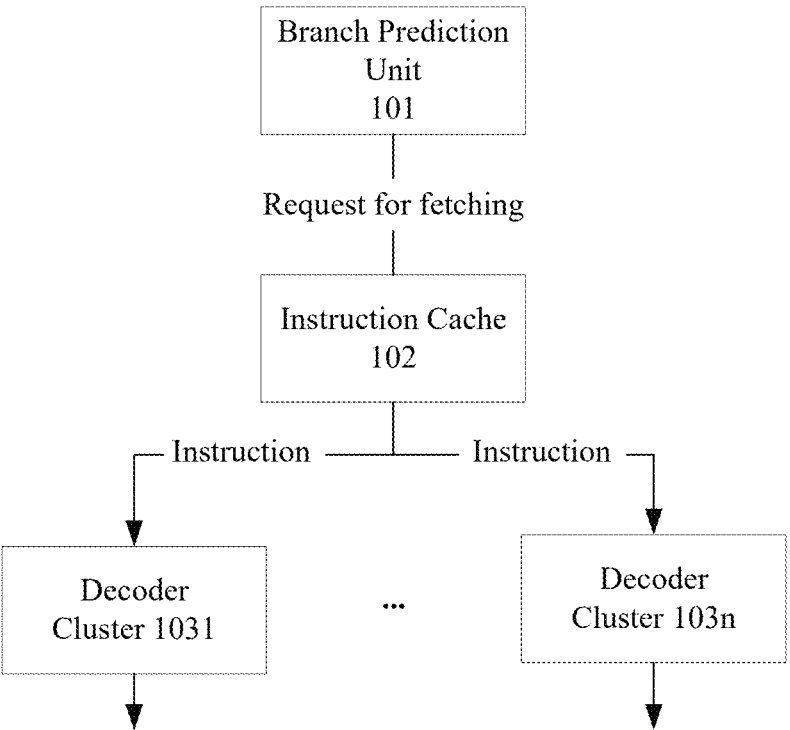
FIG. 1 shows an architectural diagram of a processor provided by at least one embodiment of the present disclosure.

Processors generally use a technique of pipelines to implement instruction processing. In the pipeline operation of a processor, instructions are processed through instruction fetching, instruction decoding, and executing. An instruction fetching operation is to fetch instructions for program operation from caches or main memories of a processor; an instruction decoding operation is to decode the fetched instructions to determine the opcodes and/or address codes and the like for the instructions; an executing operation is to implement the program operation according to the obtained opcodes and/or address codes and the like. Among them, a decoding is mainly implemented by a plurality of decoder clusters provided in the processor. As an optional implementation, FIG. 1 exemplarily illustrates an architectural block diagram of a processor including: a branch prediction unit 101, an instruction cache 102, a plurality of decoder clusters 1031 to 103*n*, wherein n denoting the quantity of decoder clusters, and the specific value of n may be based on the specific design of the processor, and the presently disclosed embodiments do not set a limit.

The branch prediction unit 101 is a digital circuit that performs branch prediction on instructions and generates a fetching request based on a branch prediction result. It should be noted that due to the possibility of branching instructions in the instructions that change the program flow, in order to reduce the pipeline delay caused by the processor waiting for the execution results of the branching instructions to determine the next step of fetching, the branch prediction unit may be provided at the front end of the processor to implement branch prediction of the instructions.

A branch prediction result is, for example, such as whether a current instruction is a branching instruction, a branching result (direction, address, destination address, etc.) of a branching instruction, and the like. In one implementation, the branch prediction unit may perform branch prediction of an instruction based on historical execution information and results of the branch instruction, thereby obtaining a range of fetch addresses of the instruction and generating a fetching request. Included in the fetching request generated by the branch prediction unit are fetching addresses of a quantity of instructions for reading corresponding instructions from an instruction cache 102.

Instructions are stored in the instruction cache 102, and a plurality of instructions to be decoded can be fetched from the instruction cache 102 according to the fetching request generated by the branch prediction unit. Optionally, the instruction cache 102 may be located in a cache portion for storing instructions in a first level cache of the processor.

The plurality of decoder clusters 1031 to 103*n* are capable of simultaneously executing decoding operations on the fetched instructions during one clock cycle of the processor, thereby implementing parallel decoding of the instructions. Wherein any decoder cluster is provided with one or more decoders, and the decoders implements the decoding operation of the instructions to derive decoded micro-ops; the decoded micro-ops may be machine-executable operation information derived from interpreting the instructions, such as a machine-executable uop formed by a control field.

Figure 2:
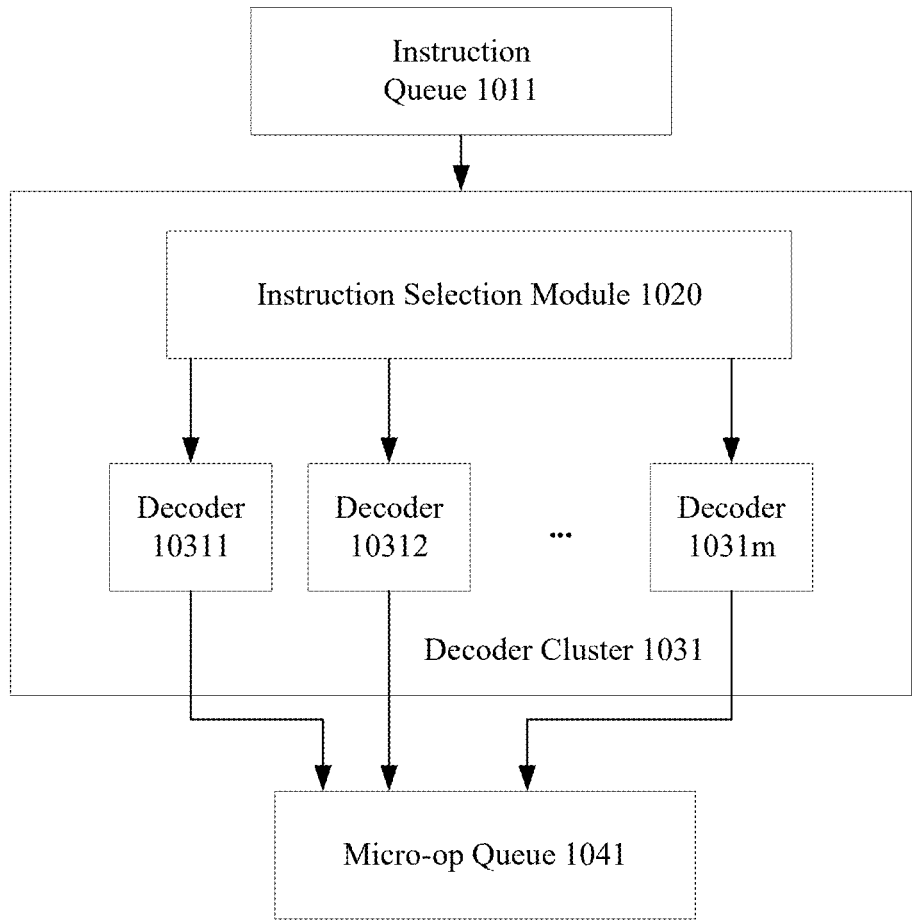
FIG. 2 shows an architectural schematic diagram of a decoder cluster provided by at least one embodiment of the present disclosure.

To illustrate the decoding process of the decoder cluster 1031 as an example, FIG. 2 illustrates an architectural schematic diagram of a decoder cluster provided by at least one embodiment of the present disclosure. In conjunction with FIG. 2, an instruction queue 1011 and a micro-op queue 1041 corresponding to the decoder cluster 1031 may be provided in the processor, where the instruction queue 1011 is configured to store instructions fetched from an instruction cache to be decoded by the decoder cluster 1031, and the micro-op queue 1041 is configured to store micro-ops obtained by the decoder cluster 1031 after the decoding of the instructions.

In the decoder cluster 1031, the decoder cluster 1031 may include: an instruction selection module 1020 and a plurality of decoders 10311 to 1031$m$, with m denoting a quantity of decoders provided in the decoder cluster. Wherein, the instruction selection module 1020, may select instructions from the instructions stored in the instruction queue 1011, and pass the selected instructions to individual decoders in the decoder cluster 1031 for decoding. The plurality of decoders of the decoder cluster 1031, after completing the decoding of the instructions, write the obtained micro-ops into the micro-op queue 1041.

In the condition where a plurality of decoder clusters is provided in the processor, parallel decoding may be performed via a plurality of decoder clusters, and the decoding process of each decoder cluster may be referred to the above description in the same way.

As can be seen from the above description, the plurality of decoders in the decoder cluster are decoded based on the instructions selected by the instruction selection module, and thus the quantity of decoders in the decoder cluster is generally provided based on the upper limit of the quantity of instructions to be selected, which leads to an idle situation of the decoders in the decoder cluster when the quantity of instructions actually selected by the decoder cluster does not reach the upper limit of the quantity of instructions to be selected, resulting in a waste of hardware resources for the process. It should be noted that, in accordance with the upper limit of the quantity selected by the instructions, m decoders are provided in the decoder cluster, and the decoder cluster is able to support the decoding of at most m instructions per clock cycle in hardware, but in practice, the quantity of instructions that may be decoded by the decoder cluster per clock cycle is often less than m. This is because instruction selection and instruction decoding usually have a lot of constraints, such as encountering a jump branch to end the decoding of the current clock cycle; or, the instruction queue is null, i.e., there is no selectable instruction, resulting in the instruction not being decoded in the current cycle; or maybe, the current instruction queue is not null, but the decoded micro-op queue is fully written, and micro-ops decoded by the decoder cluster cannot be written to the micro-op queue, and the decoding process cannot be completed in the current cycle; or alternatively, a plurality of decoders in the decoder cluster are not identical, and for complex instructions only certain decoders may be supported, so if the instruction encounters a decoder that does not support decoding, then the current cycle of decoding should be terminated.

As can be seen from the above, the quantity of instructions actually decoded by the decoder cluster is usually smaller than the upper limit of the quantity selected by the instructions, and if the quantity of decoders in the decoder cluster is provided in accordance with the upper limit of the quantity selected by the instructions, it will result in the existence of idle decoders in the decoder cluster, existing a situation of resource waste. Based on this, embodiments of the present disclosure consider reducing the quantity of decoders provided in the decoder cluster (e.g., the quantity of decoders provided in the decoder cluster is less than the upper limit of the quantity selected by the instructions) and compensating for the lack of decoding throughput in the decoder cluster due to the reduction of the quantity of decoders by the way of sharing the decoders among the decoder clusters.

Based on the above ideas, embodiments of the present disclosure provide further improved processor architectures, by which the improved processor architectures are able to support the decoding of instructions that is able to support the upper limit of the quantity selected by the instructions by each group of decoder clusters while reducing the quantity of decoders in the decoder clusters, so as to reduce the quantity of decoders used in the decoder clusters and save the processor hardware resources.

Figure 3A:
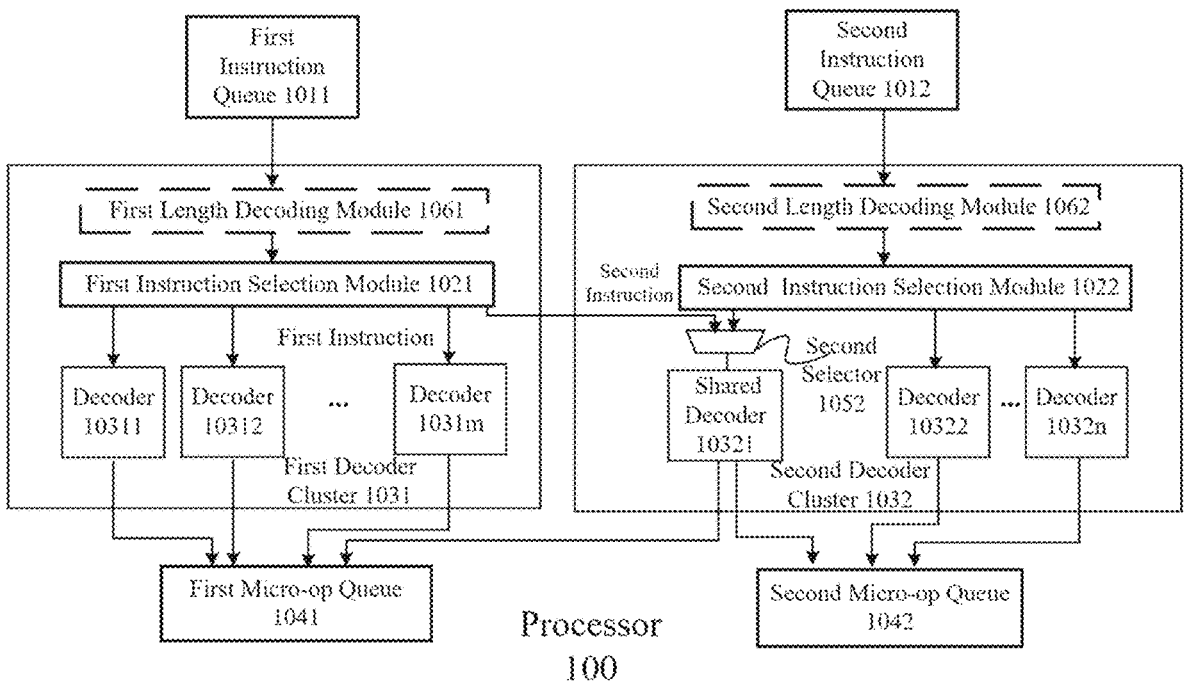
FIG. 3A shows an architectural block diagram of a processor provided by at least one embodiment of the present disclosure.

As an optional implementation, FIG. 3A exemplarily illustrates an architectural block diagram of a processor provided by at least one embodiment of the present disclosure. In conjunction with FIG. 3A, the processor 100 provided by at least one embodiment of the present disclosure includes at least: a first decoder cluster 1031, a first instruction queue 1011 corresponding to the first decoder cluster 1031, a first micro-op queue 1041 corresponding to the first decoder cluster, a second decoder cluster 1032, a second instruction queue 1012 corresponding to the second decoder cluster 1032, a second decoder cluster 1032 corresponding to a second micro-op queue 1042.

> wherein the first decoder cluster 1031 includes: a first instruction selection module 1021, a plurality of decoders 10311 to 1031$m$, wherein a specific value of m may be set according to the actual situation, and is not limited herein;

> the second decoder cluster 1032 includes: a second instruction selection module 1022, a plurality of decoders 10321 to 1032$n$, wherein the values of n and m may be the same or different; among the plurality of decoders set by the second decoder cluster 1032, there may exist a shared decoder 10321 shared by the first decoder cluster.

In addition, in the embodiments of the present disclosure, the first decoder cluster may further include: a first length decoding module 1061, configured to determine the length of each instruction to be selected in the first instruction queue; in the embodiments of the present disclosure, the second decoder cluster may also include: a second length decoding module 1062, configured to determine the length of each instruction to be selected in the second instruction queue 1012. Wherein, the length of each instruction to be selected in any one of instruction queue may be same or different. It is noted that, the first length decoding module 1061 and the second length decoding module 1062 may be provided at the same time, or may also be provided respectively according to the condition in practice, which is no limited thereto.

Apparently, in other embodiments of the present disclosure, the quantity of decoders contained in a group of decoders may also be two or more, as long as the quantity of decoders provided in the group of decoders is less than the upper limit of the quantity selected by the instructions, for example, the upper limit of the quantity selected by the instructions is 4 (i.e., the maximum bandwidth selected by the instructions is 4), then it is sufficient for the quantity of decoders provided in the group of decoders to be less than 4. In one embodiment, an embodiment of the present disclosure may have three decoders provided in the decoder cluster when the maximum bandwidth selected by the instructions is 4. Apparently, there are other optional forms in the present disclosure, which will not be repeated herein.

In the following, the process of decoding instructions by the embodiment of the present disclosure is explained by taking an example of decoding by the first decoder cluster utilizing the shared decoder provided in the second decoder cluster, and the manner in which the second decoder cluster utilizes the shared decoder provided in the first decoder cluster may be referred to in the same manner.

In a first decoder cluster 1031, the first instruction selection module 1021, is configured to select a plurality of instructions from a first instruction queue 1011 corresponding to a first decoder cluster 1031; if a quantity of the plurality of instructions is greater than a quantity of decoders of the first decoder cluster, then first instructions with a quantity corresponding to the quantity of decoders of the first decoder cluster in the plurality of instructions is assigned to a decoder in the first decoder cluster for decoding, and second instructions other than the first instructions in the plurality of instructions is assigned to a shared decoder for decoding.

Wherein, the first decoder cluster 1031 provides a first instruction queue 1011, the first instruction queue 1011 is configured to store instructions to be decoded of the first decoder cluster 1031. When the first instruction queue 1011 stores instructions to be decoded of the first decoder cluster, in order to implement parallel decoding of the first decoder cluster, as long as it is guaranteed that the first instruction queue 1011 of the first decoder cluster receives the instructions to be decoded at a speed that is faster than the decoding speed of the first decoder cluster 1031, the first decoder cluster 1031 may continuously obtain instructions from the first instruction queue to be decoded, so as to implement parallel decoding of a plurality of decoders in the first decoder cluster.

Assuming that a first length decoding module 1061 is provided in front of a first instruction selection module 1021, then the first length decoding module 1061 may determine the length of each instruction to be selected in the first instruction queue, in order to enable the first instruction selection module 1021 to select according to the length of each instruction to be selected.

In the embodiments of the present disclosure, when the quantity of the plurality of the instruction selected by the first instruction selection module 1021 is greater than the quantity of decoders of the plurality of decoders in the first decoder cluster 1031, then first instructions with a corresponding quantity is assigned to the plurality of decoders in the first decoder cluster 1031. For example, the first instruction selection module selects 4 instructions and 3 decoders are provided in the first decoder cluster 1031, then the quantity of decoders in the first decoder cluster is 3, and 3 instructions are assigned to the 3 decoders in the first decoder cluster 1031.

In further, when the quantity of the plurality of instructions selected by the first instruction selection module is greater than the quantity of decoders of the first decoder cluster 1031, for spare instructions selected by the first instruction selection module, they are referred to second instructions in embodiments of the present disclosure, which means, a instructions other than the first instructions in the plurality of instruction selected by the first instruction selection module is referred to second instructions. The second instructions may be assigned to a shared decoder provided in the second decoder cluster 1032 to decode, which is referred to a shared decoder 10321, thereby utilizing the shared decoder 10321 provided in the second decoder cluster 1032 to decode the second instructions in the plurality of instructions, implementing parallel decoding of each decoder in the first decoder cluster. In this way, if the quantity of decoders in the decoder cluster is less than the upper limit of the quantity of instructions to be selected, the shared decoders in the external decoder cluster may be borrowed for decoding, thus implementing a reduction in the quantity of decoders used in the decoder cluster while guaranteeing the decoding throughput and implementing the effect of saving the hardware resources of the processor.

It is noted that a second selector 1052 may also be provided in front of the shared decoder 10321, and the second selector 1052 may determine that the instruction to be decoded belongs to the instruction in the first instruction queue based on the tag information carried in the request for the second instructions.

Further, the first decoder cluster 1031 is also provided with a corresponding first micro-op queue 1041, and the first micro-op queue 1041 is configured to store micro-ops obtained by decoding the first instructions via the first decoder cluster 1031, and micro-ops obtained by decoding the second instructions via the shared decoder 10321; e.g., for a plurality of instructions selected by the first instruction selection module 1021, the micro-op queue stores the plurality of decoders 10311, 10312 in the first decoder cluster 1031 . . . 1031*m* decode the micro-ops obtained by the first instructions, and the micro-ops obtained by decoding the second instructions via the shared decoder 10321 in the second decoder cluster.

The plurality of decoders 10311, 10312 in the first decoder cluster 1031 . . . 1031*m*, is configured to decode the first instructions and write the micro-ops obtained by decoding the first instructions into the first micro-op queue 1041 corresponding to the first decoder cluster.

Wherein the shared decoder 10321 is configured to decode the second instructions selected by the first instruction selection module 1021, and also write the micro-ops obtained by decoding the second instructions into the first micro-op queue 1041.

As above, it can be seen that the embodiments of the present disclosure are capable of utilizing a shared decoder in an external decoder cluster to decode spare instructions when a quantity of decoders in the decoder cluster is insufficient to decode a plurality of instructions to be selected, thereby being able to reduce the quantity of decoders used in the first decoder cluster when the quantity of decoders of the decoder cluster is provided to be less than the upper limit of the quantity of instructions to be selected, and thereby reducing the quantity of decoders used in the decoder cluster to achieve the effect of saving the processor's hardware resources while guaranteeing the decoding throughput.

FIG. 3B exemplarily illustrates an optional flowchart of a method of decoding provided by at least one embodiment of the present disclosure. The method of decoding may be thought of as a method flow of a processor in the context of decoding utilizing a decoder set. The processor provided by the embodiment of the present disclosure includes at least a first decoder cluster 1031 and a second decoder cluster 1032, the second decoder cluster 1032 being provided with a processor having at least one shared decoder 10321 shared by the first decoder cluster 1031. In conjunction with FIG. 3A and FIG. 3B, the method flow may include the following steps.

In the step S31, a plurality of instructions are selected from a first instruction queue corresponding to the first decoder cluster.

In the step S32, if a quantity of the plurality of instructions is greater than a quantity of decoders of the first decoder cluster, then first instructions with a quantity of corresponding to the quantity of decoders of the first decoder cluster in the plurality of instructions are assigned to a decoder in the first decoder cluster for decoding, and second instructions other than the first instructions in the plurality of instructions are assigned to a shared decoder for decoding.

In the step S33, micro-ops obtained by decoding the first instructions via the decoders in the first decoder cluster are wrote into a first micro-op queue corresponding to the first decoder cluster, and micro-ops obtained by decoding the second instructions via the shared decoder are wrote into the first micro-op queue.

Wherein step S31 as well as step S32 may refer to the function implemented by the first instruction selection module 1021, and step S33 may refer to the function implemented by the plurality of decoders (10311, 10312, . . . 1031m) as well as the functions implemented by the shared decoder 10321, which will not be repeated here.

The embodiments of the present disclosure are capable of utilizing a shared decoder in an external decoder cluster to decode spare instructions when a quantity of decoders in the first decoder cluster is insufficient to decode instructions to be selected, thereby being able to reduce the quantity of decoders used in the first decoder cluster when the quantity of decoders of the decoder cluster is provided to be less than the upper limit of the quantity of instructions to be selected, and thereby reducing the quantity of decoders used in the decoder cluster to achieve the effect of saving the processor's hardware resources while guaranteeing the decoding throughput.

In some embodiments, instruction stored in the first instruction queue may be referred to instructions that is selectable by the first instruction selection module, and based on the specific quantity of the selectable instructions stored in the first instruction queue, there exists several conditions where the first instruction selection module selects instructions from the first instruction queue as follows:

the selectable instructions stored in the first instruction queue are null, then the first instruction selection module is unable to select an instruction and the first decoder cluster is unable to perform decoding for instructions:

the selectable instructions stored in the first instruction queue are not null, and the quantity of selectable instructions stored in the first instruction queue is greater than the quantity of decoders in the first decoder cluster, then the first instruction selection module is able to select instructions with the quantity that is greater than the quantity of decoders from the first instruction queue. By then, the selected spare instructions may be decoded with the help of the shared decoders shared by the second decoder cluster.

It should be noted that when the selectable instructions stored in the first instruction queue are not null, proving that there are currently selectable instructions in the first instruction queue, and the instructions in the first instruction queue may be selected, but the selected instructions are required to be decoded via the decoder decoding and written into the micro-op queue to complete the decoding, for this reason it is necessary to determine whether the corresponding first micro-op queue is in the state of being written to the full state, and if it is in a write-full state, the selecting a plurality of instructions from the first instruction queue corresponding to the first decoder cluster is not performed, and the plurality of instructions is selected from the first instruction queue after waiting for the first micro-op queue to be in a state that is not write-full; and if it is not in a write-full state, the plurality of instructions is selected from the first instruction queue corresponding to the first decoder cluster.

After the selection of the plurality of instructions, when the quantity of decoders in the first decoder cluster is insufficient to complete the decoding, it is required to use a shared decoder in a second decoder cluster shared with the first decoder cluster. Before using the shared decoder shared with the second decoder cluster, it is required to determine whether the shared decoder in the second decoder cluster is idle or not.

When the shared decoder in the second decoder cluster is idle, included in but not limited to these three conditions are as below:

In a first condition: the selectable instructions stored in the second instruction queue corresponding to the second decoder cluster are not null.

The second decoder cluster prioritizes decoding instructions in the second instruction queue, and when the selectable instructions stored in the second instruction queue corresponding to the second decoder cluster are null, it indicates that a plurality of decoders in the second decoder cluster are unable to perform instruction decoding, i.e., the shared decoder in the second decoder cluster is idle.

In a second condition: the second micro-op queue corresponding to the second decoder cluster is written full of micro-ops.

As previously described, similar to when the first micro-instruction queue corresponding to the first decoder cluster is written full of micro-ops, when the second micro-op queue corresponding to the second decoder cluster is written full of micro-ops, the plurality of decoders in the second decoder cluster cannot decode, and then the shared decoder in the second decoder cluster is idle.

In a third condition: the quantity of selectable instructions stored in the second instruction queue corresponding to the second decoder cluster, and the second micro-op queue is not written full of micro-ops.

It is noted that when the quantity of selectable instructions stored in the second instruction queue is less than the quantity of decoders in the second decoder cluster, the decoders in the second decoder cluster are decoding the selectable instructions stored in the second instruction queue, and when the instructions corresponding to the quantity of decoders of the selectable instructions are assigned for the decoders, some of the decoders still remain idle, wherein a shared decoder in the second decoder cluster with the shared decoders in the second decoder cluster that are shared with the first decoder cluster may be idle.

Further, it is noted that the shared decoder is actually at least one of the second decoder cluster, and when decoding is required for a decoder in the second decoder cluster, including the shared decoder shared with the first decoder cluster 1031, decoding is prioritized to be performed on the instructions in the second instruction queue 1012. The second instructions in the plurality of instructions selected by the first instruction selection module is decoded using the shared decoder 10321 in the second decoder cluster only when the selectable instructions in the second instruction queue 1012 are null.

Figure 4:
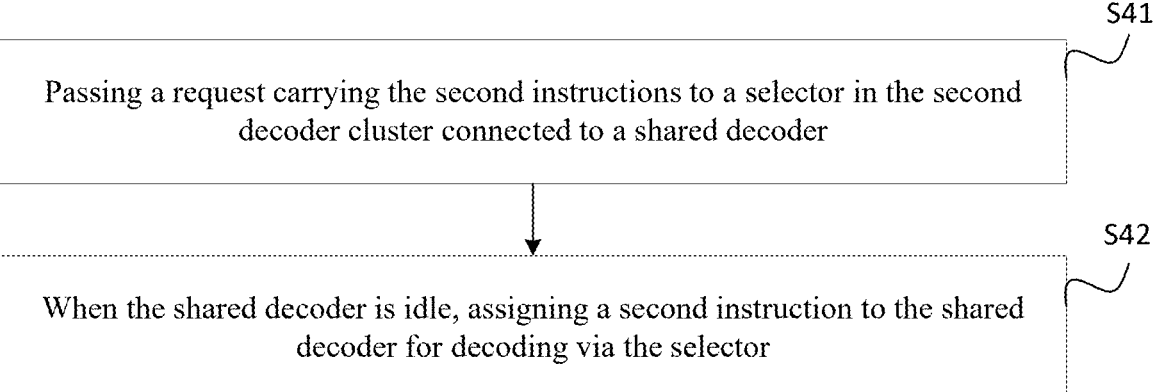
FIG. 4 shows an optional flowchart of decoding with a shared decoder provided by at least one embodiment of the present disclosure.

In some embodiments, FIG. 4 illustrates an optional flowchart of a shared decoder performing decoding. Specifically, in conjunction with FIG. 4, second instructions other than first instructions of the plurality of instructions are assigned to the shared decoder for decoding when a shared decoder in the second decoder cluster is idle including:

in step S41, a request carrying the second instructions is passed, to a selector in the second decoder cluster connected to the shared decoder, wherein the selector is configured to select to assign the second instructions, or selected instructions from the second instruction queue, to the shared decoder.

Wherein the request also carries tag information that said second instructions belong to the first decoder cluster 1031, i.e., a request carrying tag information indicating that the second instructions belong to the first decoder cluster 1031 is passed to the selector to which the shared decoder is connected.

The tag information is used to distinguish the cluster information to which the instructions to be decoded belong. For example, the tag information may be used to identify that the second instructions belong to the first decoder cluster, and thus, after the shared decoder in the second decoder cluster decodes the second instructions, the decoded micro-ops are written to the first micro-op queue based on the tag information.

Figure 5:
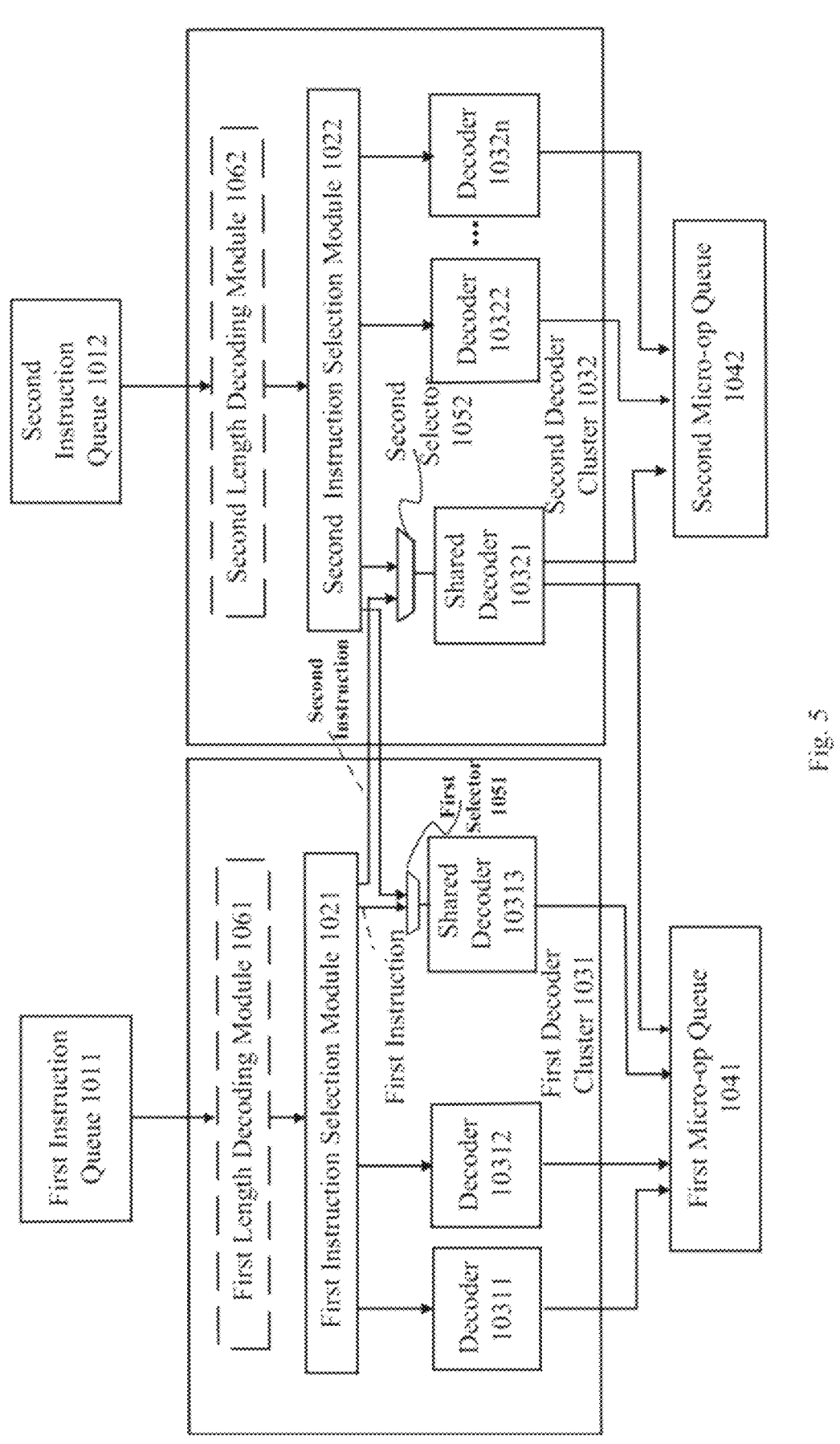
FIG. 5 shows a further architectural block diagram of a processor provided by at least one embodiment of the present disclosure.

The selector that receives the request carrying the second instructions is connected to the shared decoder (as shown in the connection of the second selector 1052 to the decoder 10321 in FIG. 5), and the selector acquires the request carrying the tag information indicating that the second instructions belong to the first decoder cluster, or the request for the second instruction queue, prior to the shared decoder, such that the selector assigns the acquired second instructions carrying the tag information or the selected instruction from the second instruction queue to the connected shared decoder.

In step S42, when the shared decoder is idle, the second instructions are assigned to the shared decoder for decoding via the selector.

At the end of the decoding, the micro-ops obtained by decoding the second instructions by the shared decoder, based on the tag information, is written to a first micro-op queue.

During decoding via the shared decoder, it is possible to distinguish whether the instruction currently being decoded is from a first instruction queue or a second instruction queue based on the tag information, and if the instruction currently being decoded is from the first instruction queue, then based on the tag information, the micro-ops obtained by decoding the second instructions are written to the first micro-op queue; if the instruction currently being decoded is from the second instruction queue, the micro-ops obtained by decoding the second instructions, based on no tag information, is written to a second micro-op queue.

It can be seen that, the first micro-op queue according to the embodiments of the present disclosure includes micro-ops obtained by decoding the first instructions via decoders in the first decoder cluster and micro-ops obtained by decoding the second instructions by a shared decoder.

In other optional embodiments of the present disclosure, it may also be the condition where the selected plurality of instructions is not greater than the quantity of decoders of the first decoder cluster. For example, when the quantity of selectable instructions stored in the first instruction queue is not greater than the quantity of decoders of the first decoder cluster, the participation of the shared decoder is not required, and the plurality of decoders in the first decoder cluster may independently complete the decoding, and for this reason, all of the selected plurality of instructions are assigned to the first decoder cluster for decoding, and the micro-ops decoded by the first decoder cluster are written to the first micro-op queue.

Apparently, the above embodiments only illustrate that the second decoder cluster is provided with at least one shared decoder that is shared by the first decoder cluster, and in other optional embodiments of the present disclosure, referring to FIG. 5, there is illustrated a further optional architectural diagram of the processor, specifically a block diagram of an architecture in which the first decoder cluster and the second decoder cluster share the shared decoders with each other.

Specifically, in conjunction with FIG. 5, the first decoder cluster 1031 is provided with a shared decoder 10313 that is shared by the second decoder cluster 1032, and the second decoder cluster 1032 is provided with a shared decoder 10321 that is shared by the first decoder cluster 1031.

Specifically, the second decoder cluster is provided with a corresponding second instruction selection module 1022 for selecting a plurality of instructions from the second instruction queue 1012, and if the selected plurality of instructions is greater than a quantity of decoders in the second decoder cluster 1032, then instructions with the quantity corresponding to the decoders in the second decoder cluster 1032 in the selected plurality of instructions are assigned to the second decoder cluster for decoding, and the other instructions other than the instructions assigned to the second decoder cluster in the selected plurality of instructions are assigned to the shared decoder 10313 in the first decoder cluster 1031 for decoding, and the micro-ops obtained by decoding via the second decoder cluster are written into the corresponding second micro-op queue, and the micro-ops obtained by decoding via the shared decoder 10313 in the first decoder cluster 1031 are written into the second micro-op queue corresponding to the second decoder cluster.

Apparently, in such a structure, each decoder cluster is provided with a corresponding instruction queue and a micro-op queue, for example, the first decoder cluster 1031 and the second decoder cluster 1032 are provided with a first instruction queue 1011 and a second instruction queue 1012, as well as a first micro-op queue 1041 and a second micro-op queue 1042, respectively, and one decoder cluster corresponds to one instruction queue and one micro-op queue. When the quantity of the plurality of instructions selected from the first instruction queue 1011 is less than the quantity of decoders of the first decoder cluster, and the quantity of instructions currently to be decoded by the second decoder cluster is greater than the quantity of decoders of the second decoder cluster, the shared decoder in the first decoder cluster is used by the second decoder cluster, and the shared decoder in the first decoder cluster decodes the instructions passed to the first decoder cluster by the second decoder cluster.

In the other words, when the shared decoder in the first decoder cluster is idle, but there is a plurality of instructions to be decoded obtained from the second instruction queue 1012 in the second decoder cluster, the plurality of instructions to be decoded may be assigned according to the quantity of decoders in the second decoder cluster 1032, and then all of the plurality of instructions to be decoded other than those assigned to the second decoder cluster, are passed to the first decoder cluster, utilizing the shared decoders in the first decoder cluster to decode the instructions passed to the first decoder cluster by the second decoder cluster.

In other embodiments of the present disclosure, it further includes: when a plurality of instructions selected from the first instruction queue is greater than the quantity of decoders in the first decoder cluster and a plurality of instructions selected from the second instruction queue is greater than the quantity of decoders in the second decoder cluster, then the first decoder cluster decodes the instructions corresponding to the quantity of decoders per cycle, and in this cycle, when the rest of instructions among the plurality of instructions other than the above instructions wait for the decoding of the next cycle in the first decoder cluster, or wait for the shared decoder in the second decoder cluster to be idle, the rest of the instructions in the plurality of instructions other than the above instructions is passed to the shared decoder in the second decoder cluster for decoding; the second decoder cluster is similar to the first decoder cluster in that the second decoder cluster decodes the instructions corresponding to the quantity of decoders per cycle, and during this cycle, when the rest of the instructions in the plurality of instructions other than the above instructions wait for the next cycle of decoding in the second decoder cluster, or wait for the shared decoder in the first decoder cluster to be idle, the rest of the instructions in the plurality of instructions other than those described above are passed to the shared decoder in the first decoder cluster for decoding.

Based on the above shared structure between the two decoder clusters, FIG. 6 shows a schematic diagram of the maximum bandwidth of the decoder clusters provided by the embodiments of the present disclosure to support decoding for instructions.

Combining FIGS. 5 and 6, the first decoder cluster 1031 contains three decoders (i.e., m is 3), then the first decoder cluster 1031 includes decoder 10311, decoder 10312, and decoder 10313; the second decoder cluster 1032 contains three decoders (i.e., n is 3), then the second decoder cluster 1032 includes decoder 10321, decoder 10322, and decoder 10323, wherein the first decoder cluster 1031 shares decoder 10321 in the second decoder cluster 1032, and the second decoder cluster 1032 shares decoder 10313 in the first decoder cluster 1031.

When the first instruction queue corresponding to the first decoder cluster 1031 is null or the first micro-op queue is full, and the second instruction queue corresponding to the second decoder cluster 1032 is null or the second micro-op queue is full, at this time neither the first instruction queue nor the second instruction queue may be selected from the first instruction queue, then the actual bandwidth used by the first decoder cluster 1031 is 0, and the second decoder cluster 1032 actually bandwidth used by the second decoder cluster 1032 is 0.

When the first instruction queue corresponding to the first decoder cluster 1031 is null or the first micro-op queue is full, and the second instruction queue corresponding to the second decoder cluster 1032 is not null and the second micro-op queue is not full, proving that the first decoder cluster 1031 is idle, and the second decoder cluster 1032 may use the shared decoder 10313 in the first decoder cluster 1031, and at this time, the decoder cluster 1031 actually uses a bandwidth of 0, and the second decoder cluster 1032 may actually use a bandwidth of up to 4.

When the first instruction queue corresponding to the first decoder cluster 1031 is not null and the first micro-op queue is not full, and the second instruction queue corresponding to the second decoder cluster 1032 is null or the second micro-op queue is full, illustrating that the second decoder cluster 1032 is idle, the first decoder cluster 1031 may use the shared decoder 10321 in the second decoder cluster 1032, and at this time, the first decoder cluster 1031 is actually using a bandwidth of up to 4, and the second decoder cluster 1032 is actually using a bandwidth of 0.

When the first instruction queue corresponding to the first decoder cluster 1031 is not null and the first micro-op queue is not full, and the quantity of selectable instructions in the first instruction queue is less than or equal to 2, and the second instruction queue corresponding to the second decoder cluster 1032 is not null and the second micro-op queue is not full, illustrating that the decoder 10311 and the decoder 10312 in the first decoder cluster 1031 are in use, and the decoder 10313 is idle and may be used by the second decoder cluster 1032, then the actual bandwidth used by the first decoder cluster 1031 is at most 2 and the actual bandwidth used by the second decoder cluster 1032 is at most 4.

When the first instruction queue corresponding to the first decoder cluster 1031 is not null and the first micro-op queue is not full, the second instruction queue corresponding to the second decoder cluster 1032 is not null and the second micro-op queue is not full, and the quantity of selectable instructions in the second instruction queue is less than or equal to 2, illustrating that the decoder 10322 and the decoder 10323 in the second decoder cluster 1032 may be used, and the decoder 10321 is idle and may be used by the first decoder cluster 1031, then the bandwidth actually used by the first decoder cluster 1031 is at most 4, and the bandwidth actually used by the second decoder cluster 1032 is at most 2.

When the first instruction queue corresponding to the first decoder cluster 1031 is not null and the first micro-op queue is not full and the quantity of selectable instructions in the first instruction queue is greater than or equal to 3, and the second instruction queue corresponding to the second decoder cluster 1032 is not null and the second micro-op queue is not full and the quantity of selectable instructions in the second instruction queue is greater than or equal to 3, illustrating that the first decoder cluster 1031 is required to use a decoder to complete the decoding of instructions whose quantity of instructions is greater than 3, and the second decoder cluster 1032 is also required to complete the decoding of instructions whose quantity of instructions is greater than 3. Then the first decoder cluster 1031 and the second decoder cluster 1032 do not share the using of a decoder, and the bandwidth actually used by the first decoder cluster 1031 is at most 3, and the bandwidth actually used by the second decoder cluster 1032 is 3, and the spare instructions wait for the next cycle of decoding.

In other embodiments, it is also possible that sharing is implemented among a plurality of decoder clusters, as long as the current decoder cluster is able to decode the corresponding instruction queue when decoding, and the shared decoder in the current decoder cluster is used by other decoder clusters with sharing relationship when it is idle, and the specific way of sharing is referred to in the foregoing, and will not be repeated herein.

Apparently, the quantity of shared decoders among the groups of decoder clusters includes, but is not limited to, one, and may be more than one, and as long as the above approach is taken, it is possible to ensure that the throughput of the decoder clusters remains unchanged, and implement the effect of saving hardware resources.

In other optional embodiments of the present disclosure, it may also include:

determining a length of each instruction to be selected, wherein the length of each instruction to be selected is the same or the different;

selecting a plurality of instructions from the first instruction queue corresponding to the first decoder cluster, including:

selecting an instruction with a length corresponding to each instruction from the first instruction queue to select a plurality of instructions, according to the length of each instruction to be selected.

It is noted that depending on the processor, it may be categorized as a processor supporting a fixed-length instruction set, and a processor supporting a variable-length instruction set. When the processor is a processor supporting a fixed-length instruction set, it is required to perform the above-described steps of length selection to enable selecting the instructions corresponding to the lengths. Referring to FIG. 5, the processor is provided with a first length decoding module 1061 that determines a length in the instructions of the first instruction queue, such that the first instruction selection module 1021 may select the instructions corresponding to the lengths.

When the processor is a processor supporting a variable-length instruction set, there is no requirement to perform the above steps of length selection, and a plurality of instructions may be selected directly from the first instruction queue. With continued reference to FIG. 5, the first length decoding module 1061 is not provided in the processor, and the first instruction selection module 1021 directly selects the plurality of instructions directly from the first instruction queue 1011.

The embodiments of the present disclosure also provide a processor, whose structure may refer to FIG. 3A or FIG. 5, the processor at least including at least a first decoder cluster 1031 and a second decoder cluster 1032; the second decoder cluster 1032 being provided with at least one shared decoder 10321 shared by the first decoder cluster 1031;

the first encoder group 1031 including: a first instruction selection module 1021 and a plurality of decoders 10311 to 1031m;

the first instruction selection module 1021, is configured to select a plurality of instructions from a first instruction queue 1011 corresponding to the first decoder cluster 1031; if a quantity of the plurality of instructions is greater than a quantity of decoders of the first decoder cluster 1031, then first instructions with a quantity corresponding to the quantity of decoders of the first decoder cluster 1031 in the plurality of instructions is assigned to a decoder in the first decoder cluster for decoding, and second instructions other than the first instructions in the plurality of instructions are assigned to a shared decoder 10321 for decoding;

the plurality of decoder 10311 to 1031m, are configured to decode the first instructions and write micro-ops obtained by decoding the first instructions into a first micro-op queue 1041 corresponding to the first decoder cluster;

wherein the shared decoder 10321 is configured to decode the second instructions and write micro-ops obtained by decoding the second instructions into the first micro-op queue.

Optionally, the first instruction selection module 1021, is configured to select a plurality of instructions from a first instruction queue corresponding to the first decoder cluster, including:

when selectable instructions stored in the first instruction queue are not null, and the first micro-op queue is not written full of the micro-ops, a plurality of instructions is selected from the selectable instructions stored in the first instruction queue;

wherein when the quantity of the selectable instructions stored in the first instruction queue is greater than the quantity of decoders of the first decoder cluster, the quantity of the selected plurality of instructions is greater than the quantity of decoders of the first decoder cluster.

Optionally, the first instruction selection module 1021, is configured to assign the second instructions other than the first instructions in the plurality of instructions to the shared decoder for decoding, including:

when the shared decoder in the second decoder cluster is idle, the second instructions other than the first instructions in the plurality of instructions is assigned to the shared decoder for decoding.

Optionally, the shared decoder in the second decoder cluster is idle, including:

selectable instructions stored in the second instruction queue corresponding to the second decoder cluster are null;

or, the second micro-op queue corresponding to the second decoder cluster is written full of micro-ops;

or, the quantity of the selectable instructions stored in the second instruction queue corresponding to the second decoder cluster is less than the quantity of decoders of the second decoder cluster, and the second micro-op queue is not written full of micro-ops.

Optionally, at least one shared decoder shared by the second decoder cluster is provided in the plurality of decoders in the first decoder cluster; the shared decoder in the first decoder cluster, is configured to: when the quantity of the plurality of instructions selected by the first instruction selection module is less than the quantity of decoders of the first decoder cluster, and the quantity of instructions currently to be decoded by the second decoder cluster is greater than the quantity of decoders of the second decoder cluster, then the shared decoder in the first decoder cluster is able to decode the instructions passed to the first decoder cluster by the second decoder cluster;

Optionally, the first decoder cluster 1031 also includes:

A first selector 1051 as shown in FIG. 5, the first selector 1051 being provided between the first instruction selection module 1021 and the shared decoder 10313 in the first decoder cluster 1031; the first selector 1051, configured to select to assign an instruction selected by the first instruction selection module, or passed by the second decoder cluster, to the shared decoder in the first decoder cluster.

Optionally, the second decoder cluster 1032 includes: a second instruction selection module 1022, a second selector 1052 as shown in FIG. 5, and a plurality of decoders 10321 through 10323;

a second instruction selection module 1022, configured to select a plurality of instructions from a second instruction queue 1012 corresponding to the second decoder cluster 1032;

a second selector 1052, provided between the second instruction selection module 1022 and the shared decoder 10321 in the second decoder cluster 1032; the second selector 1052, configured to receive a request passed by the first instruction selection module carrying second instructions; and to assign the second instructions, or the instructions selected by the second instruction selection module, to the shared decoder in the second decoder cluster decoder;

wherein when the shared decoder in the second decoder cluster is idle, the second instruction selection module assigns the second instructions to the shared decoder in the second decoder cluster for decoding.

Optionally, the request also carries tag information that the second instructions belong to the first decoder cluster;

the shared decoder 10321, is configured to write the micro-ops obtained by decoding the second instructions into the first micro-op queue, including:

writing the micro-ops obtained by decoding the second instructions into the first micro-op queue based on the tag information.

Optionally, the first instruction selection module 1021, is also configured to: if the quantity of the plurality of instructions is not greater than the quantity of decoders of the first decoder cluster, assign the plurality of instructions to the plurality of decoders in the first decoder cluster for decoding, in order to write the micro-ops obtained by decoding into the first micro-op queue by the plurality of decoders.

Optionally, the first decoder cluster 1031 also includes:

a first length decoding module 1061 as shown in FIG. 5, configured to determine a length of each instruction to be selected, wherein the length of each instruction to be selected is the same or the different;

a first instruction selection module 1021, configured to select the plurality of instructions from the first instruction queue corresponding to the first decoder cluster, including:

selecting an instruction with a length corresponding to each instruction from the first instruction queue to select a plurality of instructions, according to the length of each instruction to be selected determined by the first length decoding module.

Optionally, the second decoder cluster 1032 also includes:

a second length decoding module 1062, configured to determine a length of each instruction to be selected, wherein the length of each instruction to be selected is the same or the different;

a second instruction selection module 1022, configured to select the plurality of instructions from the second instruction queue corresponding to the second decoder cluster, including:

selecting an instruction with a length corresponding to each instruction from the second instruction queue to select a plurality of instructions, according to the length of each instruction to be selected determined by the second length decoding module.

The embodiments of the present disclosure are capable of utilizing a shared decoder in an external decoder cluster to decode spare instructions when a quantity of decoders in the decoder cluster is insufficient to decode a plurality of instructions to be selected, thereby being able to reduce the quantity of decoders used in the first decoder cluster when the quantity of decoders of the decoder cluster is provided to be less than the upper limit of the quantity of instructions to be selected, and thereby reducing the quantity of decoders used in the decoder cluster to achieve the effect of saving the processor's hardware resources while guaranteeing the decoding throughput.

The embodiments of the present disclosure also provide a chip which includes the processor as described above.

The embodiments of the present disclosure also provide an electronic device, such as a server device or a terminal device, which may include the chip described above.

Multiple embodiments of the present disclosure are described above, and the various optional approaches introduced in each embodiment can be combined and cross-referenced with each other without conflict to extend possible embodiments, all of which may be considered embodiment disclosure of the present disclosure.

While embodiments of the present disclosure are disclosed as above, the present disclosure is not limited thereto. Any person skilled in the art may make various changes and modifications without departing from the spirit and scope of the present disclosure, and therefore the scope of protection of the present disclosure shall be as limited by the claims.

What is claimed is:

1. A method for parallel decoding, which is applied to a processor, the processor comprising at least a first decoder cluster and a second decoder cluster, the second decoder cluster provided with at least one shared decoder shared by the first decoder cluster, the first decoder cluster corresponding to a first instruction queue and the second decoder cluster corresponding to a second instruction queue other than the first instruction queue, and the first decoder cluster corresponding to a first micro-op queue and the second decoder cluster corresponding to a second micro-op queue other than the first micro-op queue;

wherein the method comprises:

selecting a plurality of instructions from the first instruction queue;

determining that a quantity of the plurality of instructions is greater than a quantity of decoders of the first decoder cluster;

in response to determining that the quantity of the plurality of instructions is greater than the quantity of decoders of the first decoder cluster, assigning, from the plurality of instructions, first instructions with a quantity corresponding to the quantity of decoders of the first decoder cluster to decoders in the first decoder cluster for decoding, and assigning, from the plurality of instructions, at least one second instruction other than the first instructions to the at least one shared decoder for decoding; and writing micro-ops obtained by decoding the first instructions via decoders in the first decoder cluster into the first micro-op queue, and writing micro-ops obtained by decoding the at least one second instruction via the at least one shared decoder into the first micro-op queue, wherein the method further comprises:

determining the at least one shared decoder in the second decoder cluster being idle based on any one selected from a group consisting of:

no selectable instructions stored in the second instruction queue corresponding to the second decoder cluster;

the second micro-op queue corresponding to the second decoder cluster is written full of micro-ops; and a quantity of the selectable instructions stored in the second instruction queue corresponding to the second decoder cluster is less than a quantity of decoders of the second decoder cluster, and the second micro-op queue is not written full of micro-ops.

2. The method of claim 1, wherein the selecting the plurality of instructions from the first instruction queue corresponding to the first decoder cluster comprises:

in a case where there are selectable instructions stored in the first instruction queue and the first micro-op queue is not written full of micro-ops, selecting a plurality of instructions in the selectable instructions stored in the first instruction queue;

wherein when a quantity of the selectable instructions stored in the first instruction queue is greater than the quantity of decoders of the first decoder cluster, a quantity of selected instructions is greater than the quantity of decoders of the first decoder cluster.

3. The method of claim 1, wherein the assigning, from the plurality of instructions, the at least one second instruction other than the first instructions to the at least one shared decoder for decoding comprises:

in a case where the at least one shared decoder in the second decoder cluster is idle, assigning, from the plurality of instructions, the at least one second instruction other than the first instructions to the at least one shared decoder for decoding.

4. The method of claim 3, wherein in the case where the at least one shared decoder in the second decoder cluster is idle, assigning, from the plurality of instructions, the at least one second instruction other than the first instructions in the plurality of instructions to the at least one shared decoder for decoding comprises:

passing a request carrying the at least one second instruction to a selector in the second decoder cluster connected to the at least one shared decoder, wherein the selector is configured to select to assign, the at least one second instruction, or selected instructions from the second instruction queue, to the at least one shared decoder; and when the at least one shared decoder is idle, assigning, by the selector, the at least one second instruction to the at least one shared decoder for decoding.

5. The method of claim 4, wherein the request further carries tag information for indicating that the at least one second instruction belong to the first decoder cluster; and the writing micro-ops obtained by decoding the at least one second instruction via the at least one shared decoder into the first micro-op queue comprises:

the at least one shared decoder writing micro-ops obtained by decoding the at least one second instruction into the first micro-op queue based on the tag information.

6. The method of claim 1, wherein the method further comprises:

if the quantity of the plurality of instructions is not greater than the quantity of decoders of the first decoder cluster, then assigning the plurality of instructions to decoders in the first decoder cluster for decoding, and writing micro-ops obtained by decoding into the first micro-op queue.

7. The method of claim 6, wherein the quantity of the plurality of instructions being not greater than the quantity of decoders of the first decoder cluster comprises:

a quantity of selectable instructions stored in the first instruction queue being not greater than the quantity of decoders of the first decoder cluster.

8. The method of claim 1, wherein the first decoder cluster is provided with at least one shared decoder shared by the second decoder cluster, and the method further comprises:

if the quantity of the plurality of instructions is less than the quantity of decoders of the first decoder cluster, and a quantity of instructions to be decoded by the second decoder cluster is greater than a quantity of decoders of the second decoder cluster, then a shared decoder in the first decoder cluster decodes at least one instruction passed from the second decoder cluster to the first decoder cluster.

9. The method of claim 1, wherein the method further comprises:

determining a length of each instruction to be selected, wherein the length of each instruction to be selected is the same or different;

the selecting the plurality of instructions from the first instruction queue corresponding to the first decoder cluster comprises:

selecting an instruction with a length corresponding to each instruction from the first instruction queue to select the plurality of instructions, according to the length of each instruction to be selected.

10. A processor, comprising:

at least a first decoder cluster and a second decoder cluster, the second decoder cluster provided with at least one shared decoder shared by the first decoder cluster, the first decoder cluster corresponding to a first instruction queue and the second decoder cluster corresponding to a second instruction queue other than the first instruction queue, and the first decoder cluster corresponding to a first micro-op queue and the second decoder cluster corresponding to a second micro-op queue other than the first micro-op queue;

wherein:

the first decoder cluster comprises a first instruction selection circuit and a plurality of decoders;

the first instruction selection circuit is configured to:

select a plurality of instructions from a first instruction queue corresponding to the first decoder cluster; and in response to a quantity of the plurality of instructions being greater than a quantity of decoders of the first decoder cluster, assign, from the plurality of instructions, first instructions with a quantity corresponding to the quantity of decoders of the first decoder cluster to decoders in the first decoder cluster for decoding, and assign, from the plurality of instructions, at least one second instruction other than the first instructions to the at least one shared decoder for decoding; and the plurality of decoders are configured to decode the first instructions and write micro-ops obtained by decoding the first instructions into a first micro-op queue corresponding to the first decoder cluster, wherein the at least one shared decoder is configured to decode the at least one second instruction and write micro-ops obtained by decoding the at least one second instruction into the first micro-op queue, wherein the first instruction selection circuit is further configured to determine the at least one shared decoder in the second decoder cluster being idle based on any one selected from a group consisting of:

no selectable instructions stored in the second instruction queue corresponding to the second decoder cluster;

the second micro-op queue corresponding to the second decoder cluster is written full of micro-ops; and a quantity of the selectable instructions stored in the second instruction queue corresponding to the second decoder cluster is less than a quantity of decoders of the second decoder cluster, and the second micro-op queue is not written full of micro-ops.

11. The processor of claim 10, wherein the selecting, by the first instruction selection circuit, comprises:

in a case where there are selectable instructions stored in the first instruction queue and the first micro-op queue is not written full of micro-ops, the first instruction selection circuit selecting a plurality of instructions in the selectable instructions stored in the first instruction queue;

wherein when a quantity of the selectable instructions stored in the first instruction queue is greater than the quantity of decoders of the first decoder cluster, a quantity of selected instructions is greater than the quantity of decoders of the first decoder cluster.

12. The processor of claim 10, wherein the assigning, by the first instruction selection, comprises:

in a case where the at least one shared decoder in the second decoder cluster is idle, assigning, from the plurality of instructions, the at least one second instruction other than the first instructions to the at least one shared decoder for decoding.

13. The processor of claim 10, wherein the plurality of decoders in the first decoder cluster have at least one shared decoder shared by the second decoder cluster; the at least one shared decoder in the first decoder cluster is configured to: if the quantity of the plurality of instructions selected by the first instruction selection circuit is less than the quantity of decoders of the first decoder cluster, and a quantity of instructions to be decoded by the second decoder cluster is greater than a quantity of decoders of the second decoder cluster, decode instructions passed from the second decoder cluster to the first decoder cluster, and the first decoder cluster further comprises:

a first selector, provided between the first instruction selection circuit and the at least one shared decoder in the first decoder cluster, configured to select to assign an instruction selected by the first instruction selection circuit, or passed, by the second decoder cluster, to the at least one shared decoder in the first decoder cluster.

14. The processor of claim 10, wherein:

the second decoder cluster comprises a second instruction selection circuit, a second selector, and a plurality of decoders;

the second instruction selection module circuit is configured to select a plurality of instructions from the second instruction queue corresponding to the second decoder cluster;

the second selector is provided between the second instruction selection module circuit and a shared decoder in the second decoder cluster; and the second selector is configured to:

receive a request passed by the first instruction selection module circuit carrying at least one second instruction; and assign the at least one second instruction or an instruction selected by the second instruction selection circuit, to the at least one shared decoder in the second decoder cluster, when the at least one shared decoder in the second decoder cluster is idle, the second instruction selection circuit assigns the at least one second instruction to the at least one shared decoder in the second decoder cluster for decoding, the request further carries tag information for indicating that the atleast one second instruction belong to the first decoder cluster; and the at least one shared decoder is configured to write micro-ops obtained by decoding the at least one second instruction by the at least one shared decoder into the first micro-op queue, comprising writing micro-ops obtained by decoding the at least one second instruction into the first micro-op queue based on the tag information.

15. The processor of claim 10, wherein the first instruction selection circuit is further configured to: if the quantity of the plurality of instructions is not greater than the quantity of decoders of the first decoder cluster, then assign the plurality of instructions to the plurality of decoders in the first decoder cluster for decoding, to write micro-ops obtained by decoding into the first micro-op queue.

16. The processor of claim 10, wherein the first decoder cluster further comprises:

a first length decoding circuit, configured to determine a length of each instruction to be selected, wherein the length of each instruction to be selected is the same or different; and wherein the selecting, by the first instruction selection circuit, comprises:

selecting an instruction with a length corresponding to each instruction from the first instruction queue to select the plurality of instructions, according to the length of each instruction to be selected.

17. A chip, comprising the processor of claim 10.

18. An electronic device, comprising the chip of claim 17.

* * * * *